(12) United States Patent
Wu et al.

(10) Patent No.: US 9,866,093 B2
(45) Date of Patent: Jan. 9, 2018

(54) BRUSHLESS DC MOTOR WITH PERMANENT MAGNET ROTOR

(71) Applicants: Di Wu, East Greenwich, RI (US); Vladislav Milchev Stakev, South Easton, MA (US); Robert F. Birkenstock, Jr., Bedford, NH (US)

(72) Inventors: Di Wu, East Greenwich, RI (US); Vladislav Milchev Stakev, South Easton, MA (US); Robert F. Birkenstock, Jr., Bedford, NH (US)

(73) Assignee: Taco, Inc., Cranston, RI (US)

( * ) Notice: Subject to any disclaimer, the term of this patent is extended or adjusted under 35 U.S.C. 154(b) by 0 days.

(21) Appl. No.: 15/215,730

(22) Filed: Jul. 21, 2016

(65) Prior Publication Data

US 2016/0329786 A1  Nov. 10, 2016

Related U.S. Application Data

(62) Division of application No. 13/804,129, filed on Mar. 14, 2013, now Pat. No. 9,401,631.
(Continued)

(51) Int. Cl.
*H02K 15/03* (2006.01)
*H02K 1/28* (2006.01)
(Continued)

(52) U.S. Cl.
CPC .............. *H02K 15/03* (2013.01); *H02K 1/02* (2013.01); *H02K 1/2766* (2013.01);
(Continued)

(58) Field of Classification Search
CPC ......... Y10T 29/49012; Y10T 29/49009; Y10T 29/49075; Y10T 29/49988; H02K 1/02
(Continued)

(56) References Cited

U.S. PATENT DOCUMENTS

2007/0241622 A1* 10/2007 Toyoda .................... H02K 1/02
310/44
2011/0012463 A1* 1/2011 Duncan ................ H02K 1/2786
310/156.43
(Continued)

*Primary Examiner* — Thanh Lam
(74) *Attorney, Agent, or Firm* — Barry G. Magidoff; Paul J. Sutton

(57) ABSTRACT

The brushless DC motor of the present invention comprises a permanent magnet rotor rotating coaxially with and inside of the stator containing the electric windings, separated by a radial, axially extending gap. The rotor can be formed of four or more permanent, e.g., ferrite ceramic magnets, spaced substantially equidistantly circumferentially around the rotor and extending radially along the axial length of the rotor. The preferred ferrite magnets are substantially corrosion resistant, and thus durable in the wet rotor environment, in which it may be used, sufficient to withstand the effects of even hot salt water. Preferably, four of the permanent magnets are bar magnets, i.e., rectangular in cross-section, extending radially and perpendicularly to the adjacent magnets. Most preferably, the bar magnets are separated by generally wedge-shaped, or quadrant-shaped, sections of magnetic material. The permanent magnets are polarized so that the north-south flux lines extend transversely to each adjacent magnet, most preferably forming a so-called Halbach Array. This brushless DC motor is especially useful for driving wet rotor pumps, wherein the particular combination of elements forming the rotor results in a highly efficient, effective and durable motor.

6 Claims, 6 Drawing Sheets

Related U.S. Application Data

(60) Provisional application No. 61/716,060, filed on Oct. 19, 2012.

(51) Int. Cl.
*H02K 1/27* (2006.01)
*H02K 1/02* (2006.01)
*H02K 21/14* (2006.01)

(52) U.S. Cl.
CPC ............ *H02K 1/2773* (2013.01); *H02K 1/28* (2013.01); *H02K 21/14* (2013.01); *Y02E 10/725* (2013.01); *Y10T 29/49012* (2015.01)

(58) Field of Classification Search
USPC .......... 29/596, 598; 310/44, 156.08, 156.28, 310/156.38, 156.43
See application file for complete search history.

(56) References Cited

U.S. PATENT DOCUMENTS

| | | | | |
|---|---|---|---|---|
| 2012/0091832 A1* | 4/2012 | Soderberg | .................. | C08J 3/00 310/44 |
| 2012/0262020 A1* | 10/2012 | Smith | .................. | H02K 1/2766 310/156.07 |
| 2014/0225462 A1* | 8/2014 | Yamada | ............... | H02K 1/2713 310/44 |

* cited by examiner

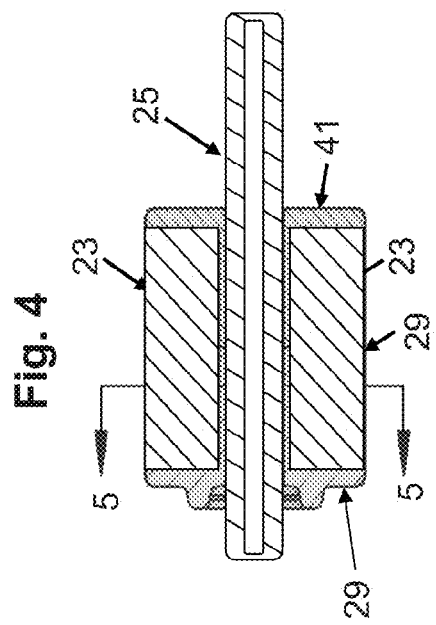
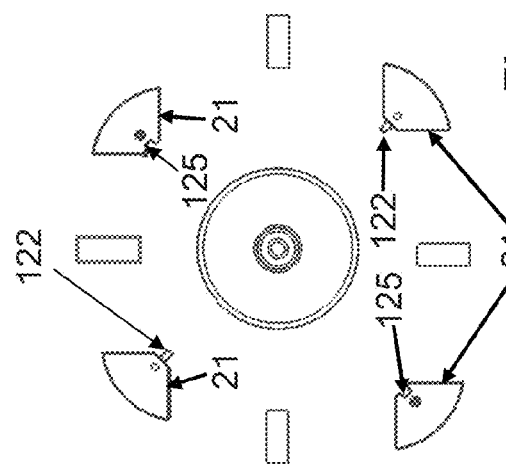

BRUSHLESS DC MOTOR WITH PERMANENT MAGNET ROTOR

This application is a divisional of and claims the benefit and filing priority of U.S. Non Provisional application Ser. No. 13/804,129 filed on Mar. 14, 2013, now U.S. Pat. No. 9,401,631, which application claimed the benefit of the filing date of Provisional Application No. 61/716,060 filed on Oct. 19, 2012.

BACKGROUND OF THE INVENTION

This invention provides an enhanced wet rotor electric motor, where the rotor magnets are subject to highly corrosive wet conditions.

In wet rotor motors, such as for centrifugal pumps, the use of the desirable soft-iron 'back-iron' becomes problematic, due to the corrosivity of the operating environment. Without such soft iron magnetic material the power output for a given electrical input to the stator coils is reduced.

It is well-known to design a brushless DC motor ("BLDC") having permanent magnets on the rotor and a fixed stator armature having electronic switches to change polarity, thus avoiding the problems created by requiring brushes to connect electric current to a moving electromagnetic armature. In the BLDC motor, generally, an electronic controller replaces the brushes used for commutation in the more common DC electric motor, for continually switching the phase of electric power to the windings by switching the polarity of the electric power presented to the motor via the stator. The BLDC motors provide more torque per weight and per watt of power input; they have greater reliability and durability, because there are no brushes to be worn, and reduced noise. Similarly, by elimination of the brush or commutator, there are no ionizing sparks which create electromagnetic interference and also further wear the parts. Furthermore, the stator windings, being stationary, can be cooled by conduction, which eliminates the need for air flow inside the motor and thus allows for entirely enclosing the motor to protect it from dirt or other foreign material.

Prior BLDC's have been designed and manufactured using permanent there the lines of North-South polarity run parallel to the rotor axis. One of the problems of controlling a brushless motor is that the electronic system must be aware of the location of the rotor magnets. The use of axially extending magnets render that determination very difficult and require sophisticated electronic sensors. It has also been known to use rare earth magnets arranged in a ring for specific uses requiring extremely high flux density, such as in wind turbine generators and in controls for high energy particle accelerators for pure physics research.

SUMMARY OF THE INVENTION

The BLDC motor of the present invention has been found Co be especially useful for wet rotor pumps, wherein the particular combination of elements forming the rotor results in a highly efficient, effective and durable motor. The BLDC motor of the present invention provides a permanent magnet rotor rotating coaxially with and inside of the stator containing the electric windings, separated by a radial axially extending gap. The rotor can be formed of four or more permanent ferrite ceramic magnets, spaced substantially equidistantly circumferentially around the rotor and extending radially along the axial length of the rotor. The ferrite magnets are substantially corrosion resistant, and thus durable in the wet rotor environment, in which it may be used, sufficient to withstand the effects of even hot salt water.

In one preferred embodiment, the permanent magnets are preferably bar magnets, i.e., rectangular in cross-section, and preferably are polarized so as to have the north-south flux lines extending circumferentially of the rotor. Most preferably, the spacing between the permanent bar magnets can be filled with generally wedge-shaped segments, especially quadrant-shaped, sections, of magnetic material, which can be of a soft iron material, or of a ferrite material, which are polarized so that the north-south flux lines extend transversely to those of the radial bar magnets, most preferably forming a so-called Halbach Array. Preferably, the wedge-shaped segments are also formed of a ferrite ceramic material. If a soft iron material is used to form the wedge-shaped segments, it is preferably encased in a water-tight shell made, for example, of a plastic film, to protect the iron from the corrosive wet environment. The ferrite ceramic material preferably forming all of the permanent magnets is highly corrosion resistant even in a hot water environment. All of the bar magnets and the wedge-shaped segment ore locked in place on a central rotor shaft.

By using the quadrant-shaped, or wedge-shaped, ferrite magnets it becomes feasible to prepare a rotor formed with a Halbach Array. Such Arrays are known to enhance the magnetic flux strength of the magnetic field generated by the permanent magnets in the rotor, and thus increase the output of the motor for a given electrical power input. These permanent magnets are most preferably arranged in a common cylindrical rotor configuration to form a type of Halbach Array.

In accordance with one preferred embodiment of the present invention, a Halbach Array permanent magnet rotor has been found to be highly effective for use in wet rotor electric motors for pumping aqueous liquids. In one such preferred embodiment of a wet rotor motor, all of the permanent magnets forming the rotor body are formed of a ferrite ceramic material, including four or more rectangular cross-section ferrite permanent magnets, and four or more generally wedge-shaped, e.g., quadrant-shaped, ferrite permanent magnets, which replace the soft iron quadrants and also alternate with the rectangular magnets. The ferrite permanent magnets are preferably all anisotropic. More preferably, the magnets are arranged so that adjacent and opposed magnets have flux lines which are of transverse or opposite polarity. In one preferred example, the wedge-shaped magnets have their North-South flux lines aligned radially in alternating directions, and the North-South flux lines of the rectangular magnets are aligned circumferentially of the rotor, also in alternating polarity directions.

Preferably, the permanent magnet rotor of this invention is coaxial with, and separated by a radial gap from, the surrounding circumferential stator, and the rotating shaft of the rotor is formed of a non-metallic, non-magnetic and corrosion resistant material, which is preferably formed so as to provide means to lock the quadrant-like portions of the rotor in place, thereby also securing the rectangular bar magnets, so that the entire rotor will rotate with the central shaft without slippage, under even the highest torque.

Preferably, the rotor shaft is hollow so as to provide a pathway for alleviating any pressure buildup, such as allowing for exiting of any gases when filling the wet rotor system with the pumped liquid, and for reducing any undesirable thermal variations in the fluid temperatures in the pump conduit.

Commonly available ferrite, or ceramic, magnetic material, are formed of a suitable combination of ferric oxide with one of Strontium ferrite, $SrFe_{12}O_{19}$ ($SrO.6Fe_2O_3$) and Barium ferrite, $BaFe_{12}O_{19}$ ($BaO.6Fe_2O_3$), both common materials for permanent magnet applications; sometimes Cobalt ferrite, $CoFe_2O_4$ ($CoO.Fe_2O_3$), is also used combined with the ferric oxide. The specific composition of the ferrite magnets is not itself a critical part of this invention, but the bar magnets as well as the wedge-shaped segments are most preferably anisotropic.

The use of the spoke-like bar magnets in the rotor, especially when combined into a Halbach Array, provides a wet rotor pump system that is uniquely efficient and powerful, as well as being durable in the corrosive environment of a wet rotor BLDC motor. The motor is both highly efficient and more compact as compared to previous wet rotor pump motors, while avoiding contamination and rust, which often occur in prior art motors of this type. Although the rare earth element magnets, which provide the greatest flux, could also be used, they are far more expensive, and the greater flux efficiency provided by the Halbach Array system, or even the simpler design of the radially extending rectangular bar magnets, avoid the need for undertaking the greater expense of the rare earth metals type of permanent magnets for motors suitable for wet rotor pumps; the cost of rare earth magnets would be prohibitive for such relatively inexpensive water pumps.

The spoke-like magnets in the present design, when used alone and not in a Halbach Array, are especially effective in an extended form, such as when the 'spoke' is formed in curved configuration. The noncorrosive nature of the ferrite magnets obviate the need for the difficult to maintain seals, which are normally used for a wet rotor pump motor of this type. These seals usually wear quickly, requiring the necessary replacement of such seals, thus increasing the costs of regular maintenance for such pumps. The seals that are necessary with this wet rotor are almost all stationary seals, which avoid the short-term maintenance required when moving seals are used.

Preferably, a nonmagnetic, ceramic rotor shaft is preferred; however, a rotor shaft made of nonmagnetic plastic, which are less costly but usually less rigid, and less resistant to twisting due to high torque conditions, can be used for small pumps, often used in small, usually single family residential water pumps, which are generally subjected to lower torque.

As noted, the permanent magnet rotor of the present invention is centrally and concentrically located, and rotates coaxially, within an outer stator, having electrical conductor windings providing the necessary variable flux. It must be noted that the stator forming an outer concentric cylinder around the central permanent magnet rotor can be formed as a single set of windings or two or more sets of windings around the central rotor. The wire windings of the stator are connected to an outside source of electricity which provides the necessary electric current to the winding wires to generate the varying magnetic polarity which causes the permanent magnets of the rotor to turn the rotor concentrically and thus power the attached pump rotor.

The following drawings disclose preferred embodiments of the present invention and may include all or most of the preferred features. The method of manufacture is also described and, again, the invention comprises the combination of steps to form the desired permanent magnet rotor.

These details of one or more embodiments of the invention are set forth in the accompanying drawings and descriptions below. Other features and advantages of the invention will become apparent from the description and the drawings and from the claims.

DESCRIPTION OF DRAWINGS

FIG. 4 is a cross-section view along lines 4-4 of FIG. 4a;

FIG. 7 depicts an exploded end view of the rotor of FIG. 4a, depicting the relative locations of the individual internal parts of the rotor.

DETAILED DESCRIPTION OF THE INVENTION

Figure 1:
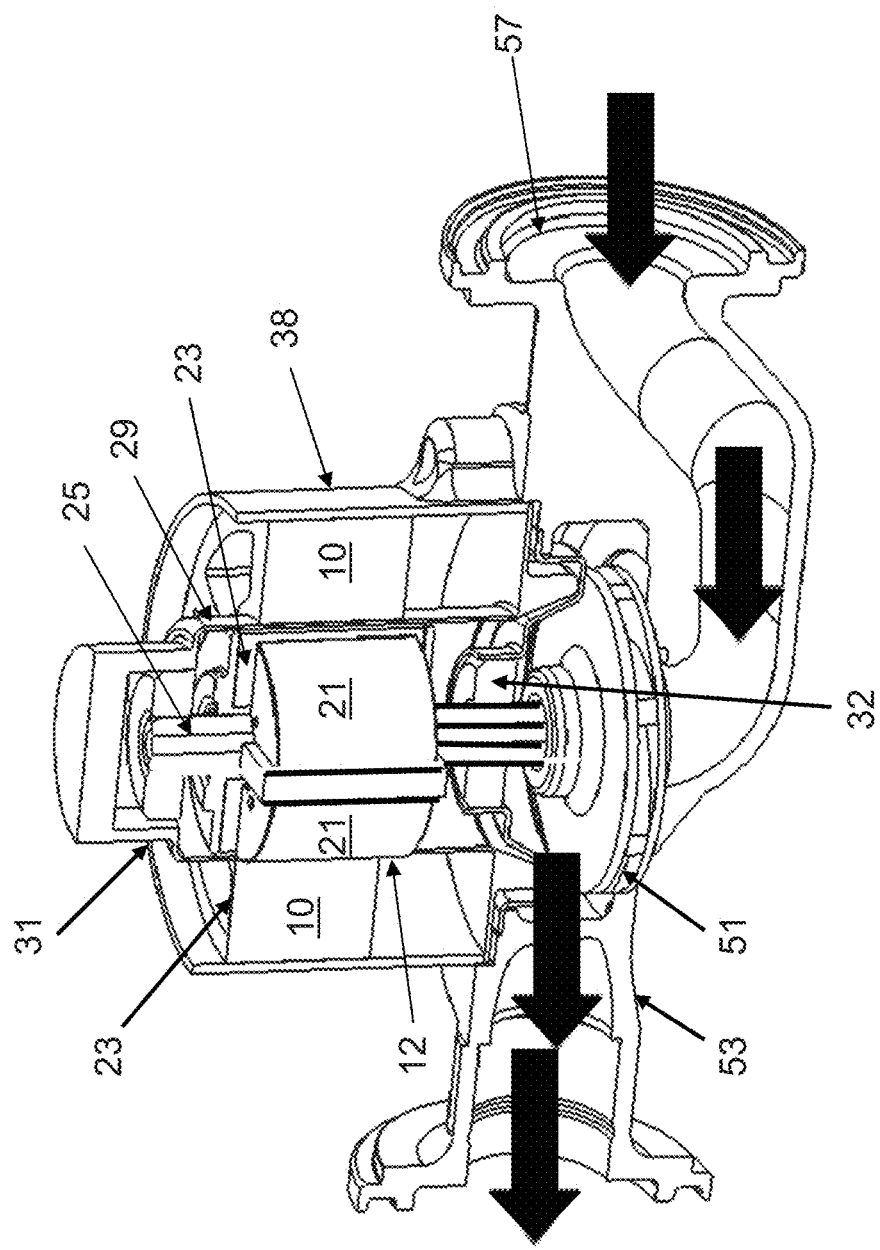
FIG. 1 is a perspective view showing a centrifugal impeller pump driven by the wet rotor, brushless DC motor of the present invention.

Referring to the drawings, they reflect preferred embodiments of the invention defined herein. The spoke-like, radially extending bar magnets are used in a brushless radial-gap motor rotor that finds especial effectiveness for a wet rotor type of installation, with a centrifugal impeller type of pump, and most preferably when a full Halbach array of permanent magnets form the rotor. These preferred embodiments are radial gap electric motors with a coaxially rotating rotor formed of a Halbach Array of permanent Magnets.

Figure 4A:
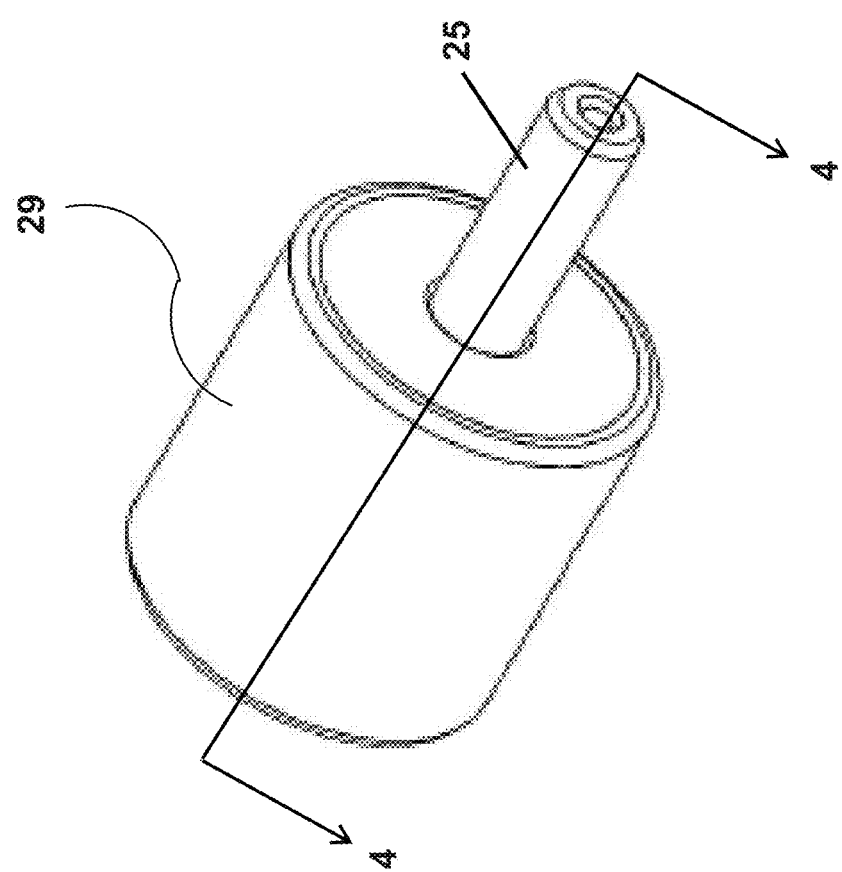
FIG. 4a is a perspective view depicting a completely encased rotor in accordance with this invention.
Figure 5:
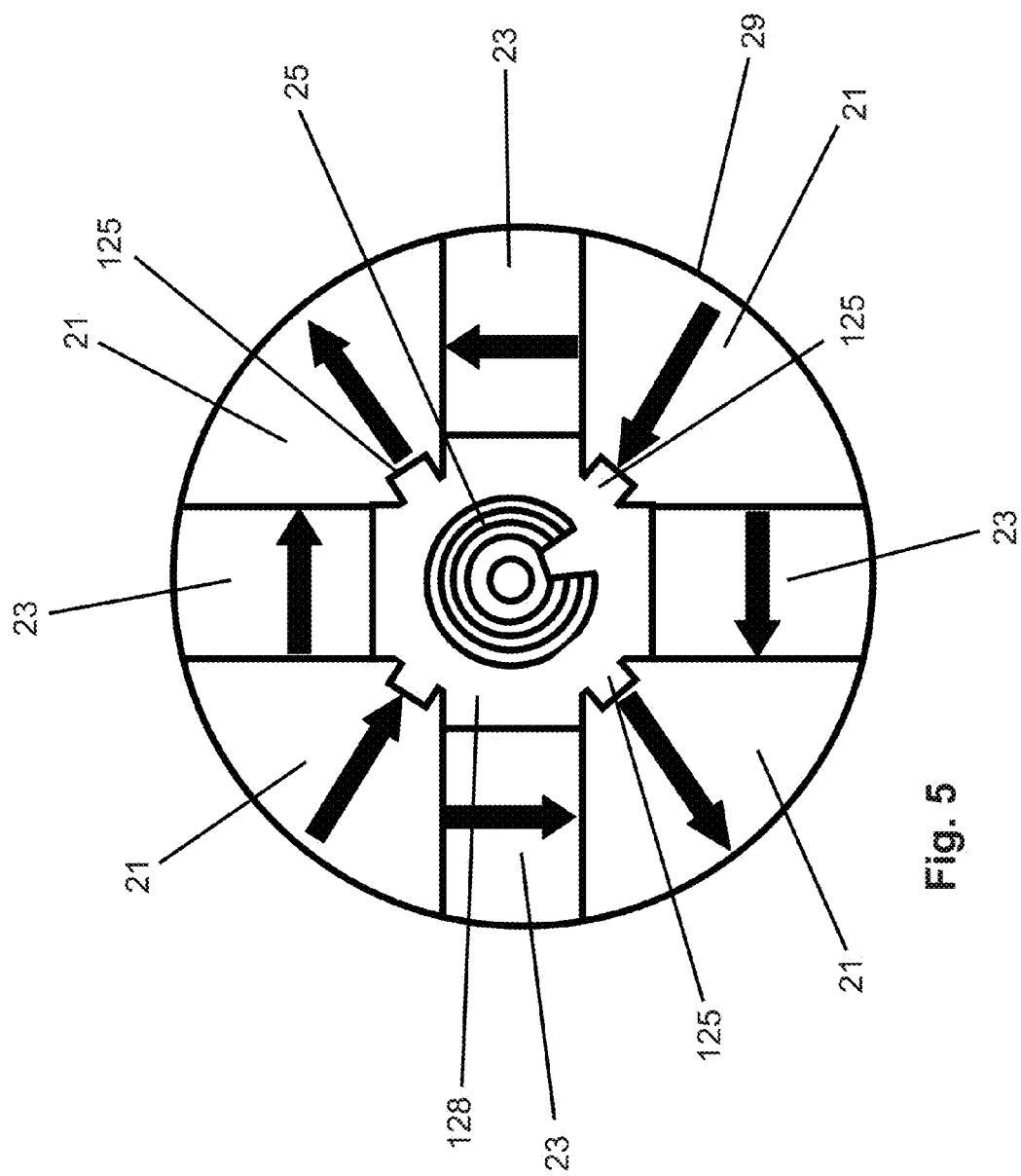
FIG. 5 is a cross-section view of the rotor taken along lines 5-5 of FIG. 4, and depicts the polarity of each of the eight ferrite magnets that form one type of Halbach Array.
Figure 6:
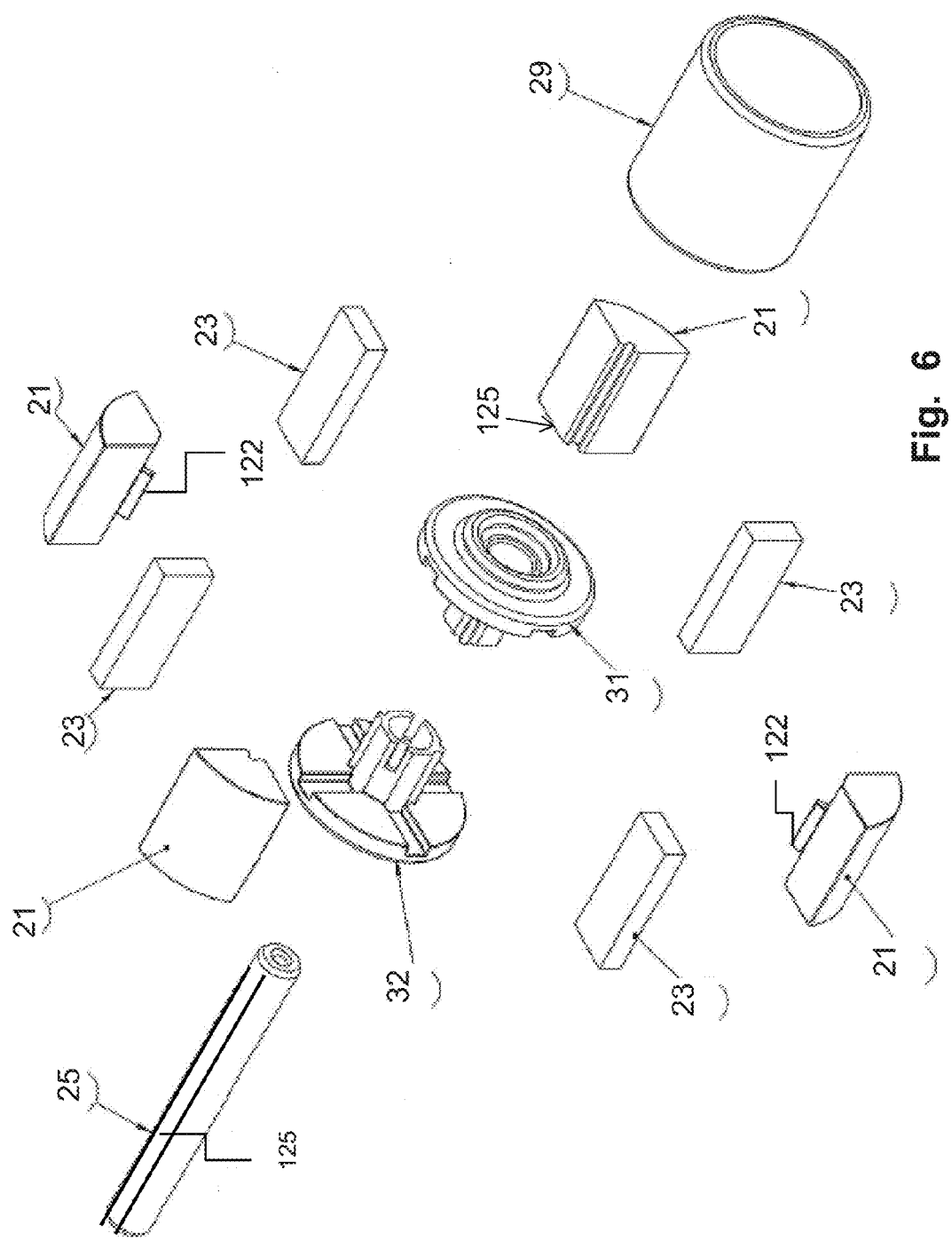
FIG. 6 is an exploded isometric view of the construction of a rotor used in a motor of the present invention.

Referring to FIG. 1, this type of combination is diagrammatically shown, including the brushless rotary motor of the present invention and its connection to a centrifugal water pump. This is a preferred use for the brushless DC motors of the present invention. As diagrammatically shown, the motor includes the stators 10, formed of electrical wire windings surrounding a soft iron core (not shown in detail); the stators 10 concentrically surround a rotor formed of a central shaft 25 locked onto radially extending permanent bar magnets 23, held in place between quadrant-shaped magnetic material 21, which can be soft iron magnetic material or most preferably a Halberg Array of permanent ferrite magnets; the magnetic material 21 is held locked in place on the central shaft between non-magnetic end caps 31 (upper end cap 31 shown as partially cut-away) and a non-magnetic circumferential sleeve 29 (also shown partially cut-away), and locked in place relative to the shaft 25. The lower end cap 32 is shown in FIGS. 4 through 6. In a preferred embodiment, the shaft and the bar magnets and quadrant-shaped magnetic material are circumferentially locked to the shaft by an injection molded plug 125, filling the gaps and indentations between and within the non-magnetic central rotor shaft and the magnetic material, as shown in FIG. 5.

A non-magnetic central shaft 25 is keyed to the magnetic material of the rotor and, when alternatingly polarized electrical power is applied to the stator windings (10), the rotor is cause to move and, through the central shaft 25, drives the centrifugal impeller (51) of the pump, driving the liquid, generally an aqueous liquid, from the inlet (57) through and out the outlet (53).

Figure 2:
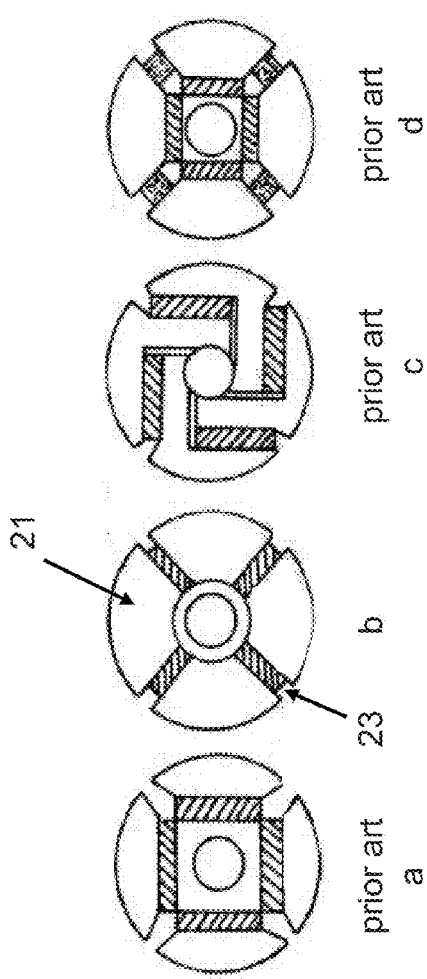
FIGS. 2a, c and d show varying prior art configurations for a permanent magnet rotor motor.
FIG. 2b shows a rotor design in accordance with the present invention including four rectangular ferrite permanent magnets held in a radially (and axially) extending, spoke-like configuration.

FIG. 2 depicts three prior art configurations of permanent bar magnets (FIGS. 2*a, c* and *d*) used by earlier workers, and a simple radial bar magnet configuration of the present invention in FIG. 2*b*.

Figure 3:
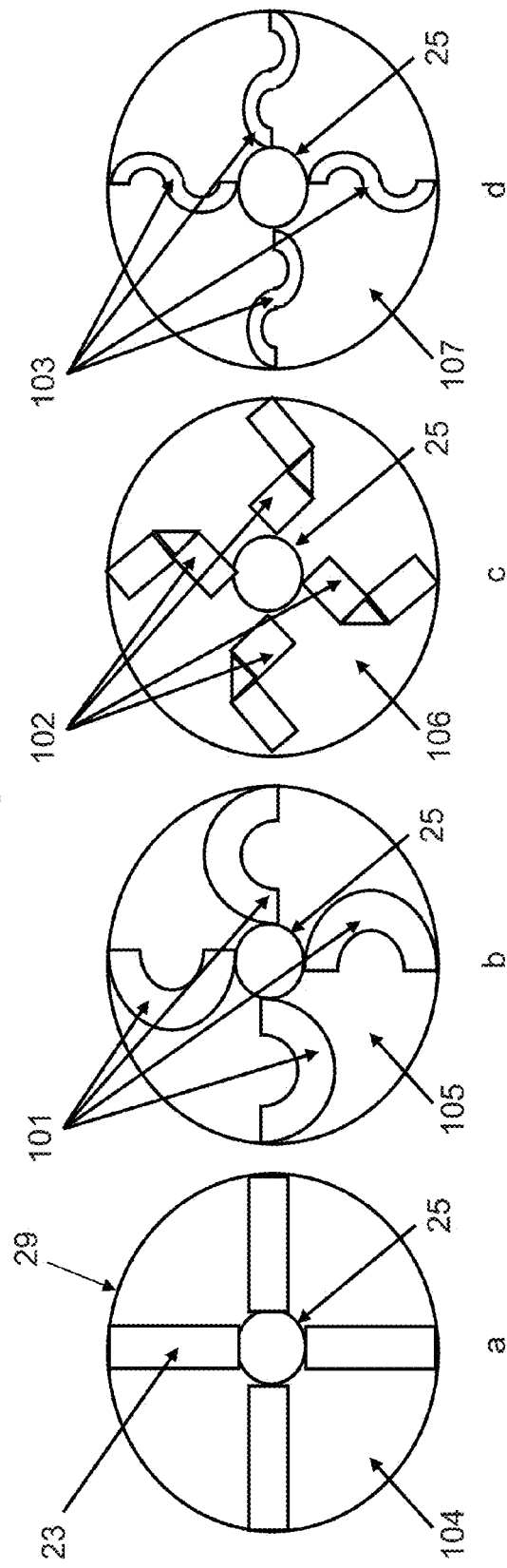
FIGS. 3a, b, c and d depict the bar magnets and three more preferred embodiments of curved or bent spokes, to provide a greater total radial length for each spoke, in accordance with a motor of the present invention.

FIG. 3*a* depicts the use of a simple, straight bar magnet in the context of the radial motor of the present invention. FIGS. 3*b, c* and *d* depict further improved versions where the flux of the permanent bar magnet is even more enhanced than in the straight-line, rectangular bar magnet, by forming a curved bar in FIG. 3*b*, in this case formed as an arc of a circle. FIG. 3*c* is a right-angle bend formed of a series of angled straight portions, forming a similar rotated surface, again to enhance the magnetic flux by effectively lengthening, and thereby increasing, the mass of magnetic material present in a given size rotor. FIG. 3*d* shows a more complex curved magnet, here in the shape of an "S," which results in an even longer effective length and thereby even further increasing the flux without increasing the angle of the magnet along the circumference of the permanent magnet rotor.

It is noted that when the permanent bar magnets (100, 101, 102 and 103) are changed in their end view shape, the similar change must be made in the shape of the intermediate quadrant-shaped material, e.g., soft-iron cores or ferrite magnets (105, 106 107), to conform to the shape of the permanent magnets at their interface.

FIGS. 4 through 7 depict a preferred embodiment of the rotor for use in the concentric motor-pump combination of this invention. FIGS. 6 and 7 show exploded views of the rotor of the present invention, FIG. 6 being the isometric drawing and FIG. 7 being an end view. Referring to FIG. 6, the rotor is assembled such that the bar magnets are locked between the quadrant-shaped segments (21), which in turn are keyed in onto the shaft (25) and the end caps (41 and 43).

As shown, in assembling the rotor in accordance with this invention, the bar magnets are held between the quadrant-shaped segments (21), which are keyed into the end caps (41, 43). In addition, the shaft which passes through the end caps and centrally of the end caps (41 and 43), is also keyed into the end caps and the apex (121) of one or more of the edge slots (144) on alternating quadrants. The quadrant segments can be locked onto the rotor central shaft 25 by machining the quadrants and the shaft to form complementary indents 125 and protrusions 122. Preferably, however, to avoid the necessity of carefully calibrating the locations of the indents 125 and protrusions 122, one or more of the quadrants and the central shaft can have indents formed along their mating surfaces and a settable polymer locking material 128 can be injection molded in situ, after the permanent bar magnets (23) and quadrants (21) are assembled onto the shaft 25 and within the outer sleeve 29, as shown in FIGS. 4 and 5.

The central rotor shaft (25) is preferably made of a non-magnetic ceramic material for all but the smaller motors. For the smaller motors, a plastic shaft, also non-magnetic, may provide sufficient strength to withstand the relatively low torque of the small motor.

The end liners (41 and 43) are provided with slots to hold the permanent magnet bars in place in the case of the wholly rectangular magnets shown in FIG. 6, a simple slot in direct line with the magnet can be formed. Where a more complex shape is used, i.e., the circle arc of FIG. 3*b*, the slot will be of a different shape to match the edge of the arc where it contacts the end piece. Similarly, where a curved or bent permanent magnet is used, the intermediate core quadrants should also be provided with an indentation to match that shape, in order to hold the magnets in place. Alternatively, they can be held in place by a key for the end caps (31 and 32) and the shaft (25). The quadrants (21), in this embodiment of FIGS. 6 and 7, are provided with key slots and key protrusions (122 and 125), which mate with corresponding slots or protrusions on the end pieces (31, 32) and the shaft (25). Finally, the unit is preferably fully assembled within an outer sleeve (29), preferably made of non-magnetic stainless steel material, surrounding the unit to hold all of the magnetic pieces firmly together in place.

Referring to FIG. 6, a more detailed presentation is given for the various pieces, clearly showing the key slots and projections for holding the bar magnets and the core quadrant pieces together and ensuring that when the rotor spins upon the application of alternating polarity voltage to the stator windings, the shaft spins without slippage, together with the permanent magnets of the rotor operating, for example, the water pump shown in FIG. 1.

The brushless motors, as indicated by their name, are not provided the necessary commutation for the electromagnetic windings of the stator by the use of brushes. Instead, there are two common methods for controlling the commutation sequence. First is a Hall sensor system where the stator commutation is controlled electronically based upon the change of state of a so-called Hall sensor, caused by the varying magnetic field polarity to which the sensor is exposed, as the rotor turns. In this way, the location of the permanent magnets relative to the stator windings is determined and the commutation of the stator windings can thus be controlled. Alternatively, commutation can also be provided based upon the monitoring of the back EMF signals from the motor, instead of the signals from the Hall sensors. There is a well-known and defined relationship between the Hall sensors and the back EMF and, thus, it is possible to provide the necessary commutation sequencing without requiring the presence of the Hall sensors, but utilizing the same electronics. The design of the present invention renders the use of back EMF to determine commutation especially effective.

The elimination of the Hall sensors is extremely useful in, for example, a wet rotor pump, where the Hall sensors might otherwise be rapidly corroded or covered with debris. The use of either of the back EMF or the Hall sensor commutation methods, or another method, however, are not part of the present invention and any suitable system can be used accordance with their conventionally known operation, or as developed in the future. In addition, if other commutation methods are created in the future, there is no reason known as to why they would not also be applicable to the brushless motor of the present invention.

In forming a permanent spoke magnet brushless DC motor, using the preferred embodiment of a curved radially extending permanent magnet, the permanent magnet and the soft iron core pieces are formed in a complimentary fashion such that the curved surfaces of the magnet fit along the complimentarily formed curved surfaces on the sides of the soft iron quadrants to form the rotors. Such molding is not beyond the scope of the present system of manufacturing such materials. The pieces, i.e., the curved magnets and the soft iron cores, are assembled and placed within an outer magnet sleeve.

A rotor shaft, preferably one formed of a non-magnetic ceramic material, is centrally located along the axis of the magnets and the soft iron core pieces within the circumferential sleeve and a water insoluble plastic is injection molded in the spaces between the members so as to hold the magnets and the soft iron core pieces together on the ceramic shaft. In this manner, the rotor can be easily formed and maintained in a desired configuration without requiring expensive tooling. The use of the curved permanent magnets increases substantially the amount of magnet flux per unit area of a rotor and thereby raises the torque output of the motor, allowing a motor to operate a higher capacity circulating pump.

A more difficult situation exists in assembling a rotor in the form of a Halbach Array of magnets. It is well known that there is a strong repulsive force set up after about half of the magnets are installed within a sleeve, especially if the anisotropic magnets have been magnetized to saturation. The magnets must be forcefully inserted and held within the rotor sleeve as the last several magnets are added. However, if the anisotropic ferrite magnetic shapes are not magnetized, or only weakly magnetized, prior to assembling the rotor magnets, the assembly of the magnetic material is far more easily accomplished. Following the high temperature sintering of the wet slurry molded anisotropic magnetic material, the anisotropic magnetic material is usually either fully demagnetized or only very weakly magnetized. The collection of magnetic ferrite materials are then assembled within the non-magnetic sleeve and around the central nonmagnetic shaft, and the magnetic shapes within each rotor, can thereafter be fully magnetized to saturation by known means, to form the Halbach array.

It is possible to magnetize the oppositely polarized magnets forming the Halbach array because they have previously been locked into the desired anisotropic configuration during molding and the subsequent sintering operation. The formation of the weakly magnetized, or unmagnetized, sintered forms do not form a part of this invention. However, by completing the magnetization, at least of the quadrant-shaped pieces, and preferably of all of the anisotropic permanent magnets, after assembly, the rotor of this invention can be more readily assembled in the desired configuration. Each of the magnets can then be fully magnetized, even to saturation, by utilizing known magnetizing fixtures and methods for use with anisotropic magnetic material, to achieve the desired final spatially alternating polarity, for example as shown in FIG. 5.

The procedures for molding and sintering anisotropic ferrite magnetic materials are well-known and are available commercially. One common means of manufacturing, as described by e-MagnetsUK on its website, is as follows:

Ferrite Magnets (Ceramic Magnets) are produced by calcining (at between 1000 to 1350 degrees C.) a mixture of iron oxide (Fe2O3) with one or more of strontium carbonate (SrCO3) or barium carbonate (BaCO3) to form a mixed metallic oxide. In some grades, other chemicals such as cobalt (Co) and lanthanum (La) are added to improve the magnetic performance. This metallic oxide is then milled to a small particle size (less than a millimeter in size; usually a few microns). Then the process has two main production options depending on the type of magnet required.

To form the preferred anisotropic magnets the fine oxide crystal powders are mixed with water to produce a slurry which is then compacted in a die in the presence of an externally applied magnetic field. The external magnetic field helps the hexagonal crystal structure (e.g. of the ferrite) align more perfectly with the magnetic field, improving the magnetic performance—the water in the slurry acts like a lubricant allowing the crystals to form into the desired anisotropic alignment. This results in an anisotropic ferrite magnet with potentially stronger final magnetic properties, but it will often require additional machining stages to give the final dimensions, if spatial precision is necessary. Sometimes a wet extrusion is performed instead of wet die pressing (to make arcs for example, as when forming the quadrant shapes of the rotors of this invention.)

The magnet is then cut to the required shape and size, and then sintered at a temperature of between about 1100-1300 degrees C.) to fuse the particles together. Any prior magnetization is substantially completely lost due to the high temperature during sintering, but the anisotropic crystal alignment remains. If any final machining needs to be performed, it is usually carried out using diamond cutting tools, once the sintered mass has cooled.

Quite often the magnetic pole faces are machined/ground to the required finish and the other surfaces are left in an as-sintered state. The magnets are then washed and dried, at e.g., room temperatures, before being assembled to the rotor shaft and sleeve, and magnetized to saturation. The final rotor is then inspected and packed for shipping to the customer. If desired, the final anisotropically structured forms can be shipped in the nonmagnetized state, to be assembled before magnetization.

Ferrite magnets made by wet pressing, instead of wet slurry molding, have better magnetic properties but are more likely to have larger dimensional tolerances. As described above, the magnets are finally formed with tooling (dies).

The above examples describe preferred embodiments of the present invention and they may be modified as new developments are made to the individual steps, without departing from the scope of the present invention. The present invention is more fully defined and its scope determined by the following claims.

What is claimed is:

1. A method of manufacturing the rotor for a brushless DC motor, the rotor comprising a plurality of permanent magnets surrounding a central axis, the permanent magnets being formed of anisotropic magnetic material aligned transversely to adjacent magnetic material; the method comprising forming each of the plurality of magnets from anisotropic magnetic material in a shape complementary to each other to form jointly a rotor assembly surrounding a central shaft opening; the anisotropic magnetic material is provided in the form of a slurry of finely ground ferrite crystals, the slurry is formed under pressure to the desired shape, in the presence of a magnetic field to align the crystals anisotropically, the formed shapes are sintered to fuse the crystal particles together in the desired anisotropic alignment in a weakly magnetized state; the formed magnets are arranged in the proper order to form the shape of the rotor such that each magnet is polarized in a direction transverse to the adjacent magnets, based upon the anisotropic alignment of the crystals; the magnets are secured together in the rotor shape and the shaped rotor is magnetized to form relatively stronger magnets having the transversely arranged magnetic polarity, having the desired strength and polarity of magnetism for each permanent magnet on the rotor.

2. In the method of manufacturing the rotor for a brushless DC motor in accordance with claim 1, wherein the individual weakly magnetized permanent magnets are secured together about the central open axis by a non-magnetic sleeve surrounding and coaxial with the rotor pieces, and the central shaft before being magnetized to form relatively stronger magnets.

3. In the method of manufacturing the rotor for a brushless DC motor in accordance with claim 2, wherein the individual permanent magnets are secured to a non-magnetic central shaft extending along the central open axis and further magnetizing to saturation each of the magnetic shapes forming the rotor to form permanent magnets of the desired polarity.

4. In the method of manufacturing the brushless DC motor of claim 1, the slurry comprises primarily crystals of ferric oxide mixed with quantities of other metal oxides selected from the group consisting of strontium carbonate (SrCO3) and barium carbonate (BaCO3) and cobalt carbonate ($CoCO_3$).

5. In the method of manufacturing the rotor for a brushless DC motor in accordance with claim 2, wherein the polarities of the anisotropic crystals are so arranged that when fully magnetized the rotor is formed into a Halbach Array.

6. A method of manufacturing the rotor for a brushless DC motor, the rotor comprising a plurality of permanent magnets surrounding a central axis, the permanent magnets being formed of anisotropic magnetic material aligned transversely to adjacent magnetic material, comprising assembling the plurality of weakly magnetized such anisotropic in the proper order to form the shape of the rotor, such that each magnet is polarized in a direction transverse to the adjacent magnets, based upon the anisotropic alignment of the crystals; the magnets are secured together in the rotor shape and the shaped rotor is magnetized to form relatively stronger magnets having the transversely arranged magnetic polarity, having the desired strength and polarity of magnetism for each permanent magnet on the rotor.

\* \* \* \* \*